US008915086B2

(12) United States Patent
Umeh et al.

(10) Patent No.: US 8,915,086 B2
(45) Date of Patent: Dec. 23, 2014

(54) SYSTEM FOR CONTROLLING COMBUSTION DYNAMICS AND METHOD FOR OPERATING THE SAME

(75) Inventors: Chukwueloka Obiora Umeh, Schenectady, NY (US); Joel Meier Haynes, Niskayuna, NY (US); Jeffrey Scott Goldmeer, Latham, NY (US)

(73) Assignee: General Electric Company, Niskayuna, NY (US)

( * ) Notice: Subject to any disclaimer, the term of this patent is extended or adjusted under 35 U.S.C. 154(b) by 1408 days.

(21) Appl. No.: 11/500,087

(22) Filed: Aug. 7, 2006

(65) Prior Publication Data

US 2010/0223933 A1 Sep. 9, 2010

(51) Int. Cl.
F02C 1/00 (2006.01)
F02C 7/22 (2006.01)
F02C 9/40 (2006.01)

(52) U.S. Cl.
CPC .............. *F02C 9/40* (2013.01); *F05D 2210/30* (2013.01); *F05D 2270/64* (2013.01); *F02C 7/22* (2013.01); *F05D 2270/082* (2013.01); *Y02T 50/677* (2013.01)
USPC .......................................... 60/772; 60/39.23

(58) Field of Classification Search
CPC .......... F02C 7/22; F02C 9/40; F05D 2270/64; F23R 3/26; Y02T 50/677
USPC .............. 60/39.23, 39.27, 794, 750, 752, 772
See application file for complete search history.

(56) References Cited

U.S. PATENT DOCUMENTS

| 4,050,240 | A | * | 9/1977 | Vaught | 60/39.23 |
|---|---|---|---|---|---|
| 4,138,842 | A | * | 2/1979 | Zwick | 60/39.23 |
| 4,150,539 | A | * | 4/1979 | Rubins et al. | 60/39.23 |
| 4,255,927 | A | * | 3/1981 | Johnson et al. | 60/39.23 |
| 5,172,547 | A | * | 12/1992 | Lawrence et al. | 60/234 |
| 5,428,951 | A | * | 7/1995 | Wilson et al. | 60/776 |
| 6,056,204 | A | * | 5/2000 | Glezer et al. | 239/8 |
| 6,263,663 | B1 | * | 7/2001 | Grienche et al. | 60/794 |
| 6,324,828 | B1 | * | 12/2001 | Willis et al. | 60/773 |
| 6,425,240 | B1 | * | 7/2002 | Park | 60/39.23 |
| 6,883,330 | B2 | | 4/2005 | Guinan et al. | |
| 6,925,809 | B2 | | 8/2005 | Mowill | |
| 2004/0020209 | A1 | * | 2/2004 | Nakae | 60/723 |
| 2004/0107701 | A1 | * | 6/2004 | Miyake et al. | 60/772 |
| 2004/0206091 | A1 | | 10/2004 | Yee et al. | |
| 2005/0034444 | A1 | | 2/2005 | Sanders | |
| 2005/0095542 | A1 | | 5/2005 | Sanders et al. | |
| 2006/0102800 | A1 | * | 5/2006 | Saddoughi | 244/207 |
| 2007/0227153 | A1 | * | 10/2007 | Truax | 60/772 |

FOREIGN PATENT DOCUMENTS

| EP | 1211401 A1 | 6/2002 |
|---|---|---|
| EP | 0964206 B1 | 12/2004 |

* cited by examiner

Primary Examiner — Phutthiwat Wongwian
(74) Attorney, Agent, or Firm — Ann M. Agosti

(57) ABSTRACT

A system for controlling combustion dynamics is provided. The system includes a combustor having a combustion chamber and an inlet for feeding a fuel-air mixture into the combustion chamber. The system also includes a dome plate at an upstream end of the combustion chamber. The system further includes a liner along a length of the combustion chamber. The system also includes an actuator configured to control one or more recirculating zones in the combustion chamber.

18 Claims, 5 Drawing Sheets

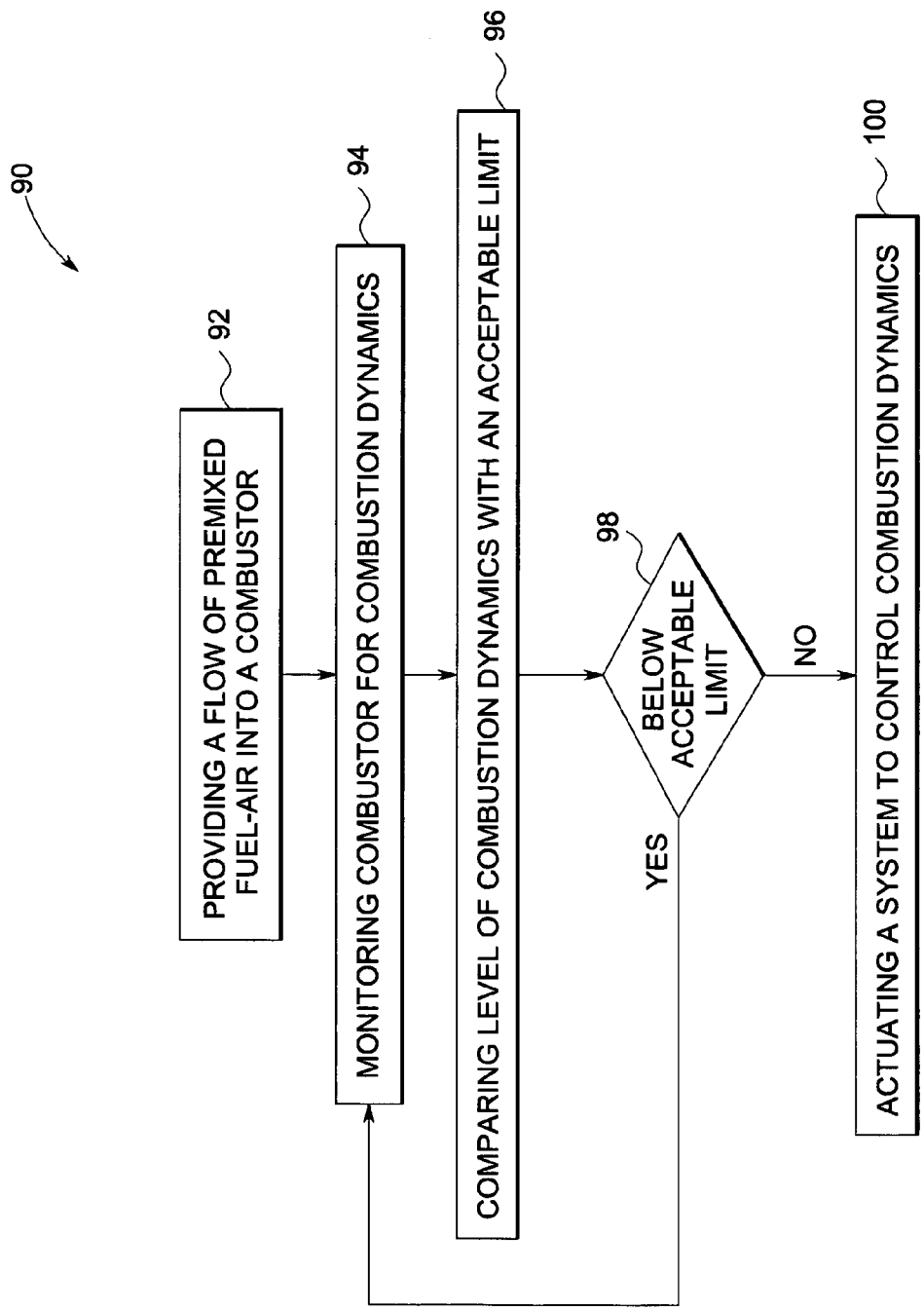

SYSTEM FOR CONTROLLING COMBUSTION DYNAMICS AND METHOD FOR OPERATING THE SAME

BACKGROUND

The invention relates generally to combustion dynamics and, more particularly, to combustion dynamics in gas turbine combustors.

Fuel injection and mixing are critical to achieving efficient and clean combustion in gas turbine engines. Fuels can be provided in two forms, namely gaseous form and liquid form. In the case of gaseous fuels, it is desirable to obtain an optimal level of mixing between air, fuel, and combustion products in a combustion zone. When liquid fuels are employed, they are atomized into small droplets and distributed in an air stream before entering the combustion zone.

Exhaust gases from gas turbine engines contain substances such as Nitrogen Oxides (NOx) that are harmful regulated emissions. Hence, there has been increased demand in recent years for gas turbines that operate in partially premixed (PP) or lean, premixed (LP) mode of combustion in an effort to meet increasingly stringent emissions goals. Partially premixed (PP) and lean premixed combustion reduces harmful emission of Nitrogen Oxides without loss of combustion efficiency.

However, combustion instabilities, also known as combustion dynamics, are commonly encountered in development of low emissions gas turbine engines. Combustion dynamics in the form of fluctuations in pressure, heat-release rate, and other perturbations in flow may lead to problems such as structural vibration, excessive heat transfer to a chamber, and consequently lead to failure of the system.

Therefore, a need exists for an improved system for controlling combustion dynamics that may address one or more of the problems set forth above.

BRIEF DESCRIPTION

In accordance with an embodiment of the invention, a system for controlling combustion dynamics is provided. The system includes a combustor having a combustion chamber, a fuel inlet, and an air inlet for feeding a fuel-air mixture into the combustion chamber. The system may also include a dome plate at an upstream end of the combustion chamber. The system further includes a liner along a length of the combustion chamber.

In accordance with another embodiment of the invention, a method of controlling combustion dynamics is provided. The method includes providing a flow of premixed fuel and air into a combustion chamber. The method also includes monitoring the combustion process for combustion dynamics. The method further includes actuating a system to control combustion dynamics.

DRAWINGS

These and other features, aspects, and advantages of the present invention will become better understood when the following detailed description is read with reference to the accompanying drawings in which like characters represent like parts throughout the drawings, wherein:

FIG. 5 is a flow chart illustrating exemplary steps for a method of operation of a system controlling combustion dynamics in a combustion chamber.

DETAILED DESCRIPTION

As described in detail below, embodiments of the present invention provide a system for controlling combustion dynamics and a method for operating a combustor to control combustion dynamics. The term "combustion dynamics" used herein refers to fluctuations in air pressure, temperature, heat release and unsteady flow oscillations that effect operation of an engine. The system includes controlling combustion dynamics in a partially premixed or lean premixed combustion chamber. A partially premixed or lean premixed combustion chamber is commonly used in gas turbine engines as it reduces emission of pollutants. In a partially premixed or lean premixed combustion, fuel and air are premixed upstream of the combustion chamber and the combustion chamber is operated with excess air so as to reduce flame temperature and consequently reduce emission of regulated gases such as Nitrogen Oxides.

Lean premixed combustors operate with a swirling jet flow since swirling helps in sustaining flames in a combustion chamber. The interaction of the swirling flow with the shape of the combustion chamber results in zones referred to as recirculation zones. In a non-limiting example, flow of a premixed fuel-air mixture from a fuel nozzle may interact with a combustion chamber liner interface creating a recirculation zone. In cases when the recirculation zones are formed at corners of the combustion chamber, the recirculation zones are referred to as 'corner recirculation zones'. In cases where the recirculation zones are formed at the center of the combustion chamber, the recirculation zones are referred to as 'center toroidal recirculation zone'.

Figure 1:
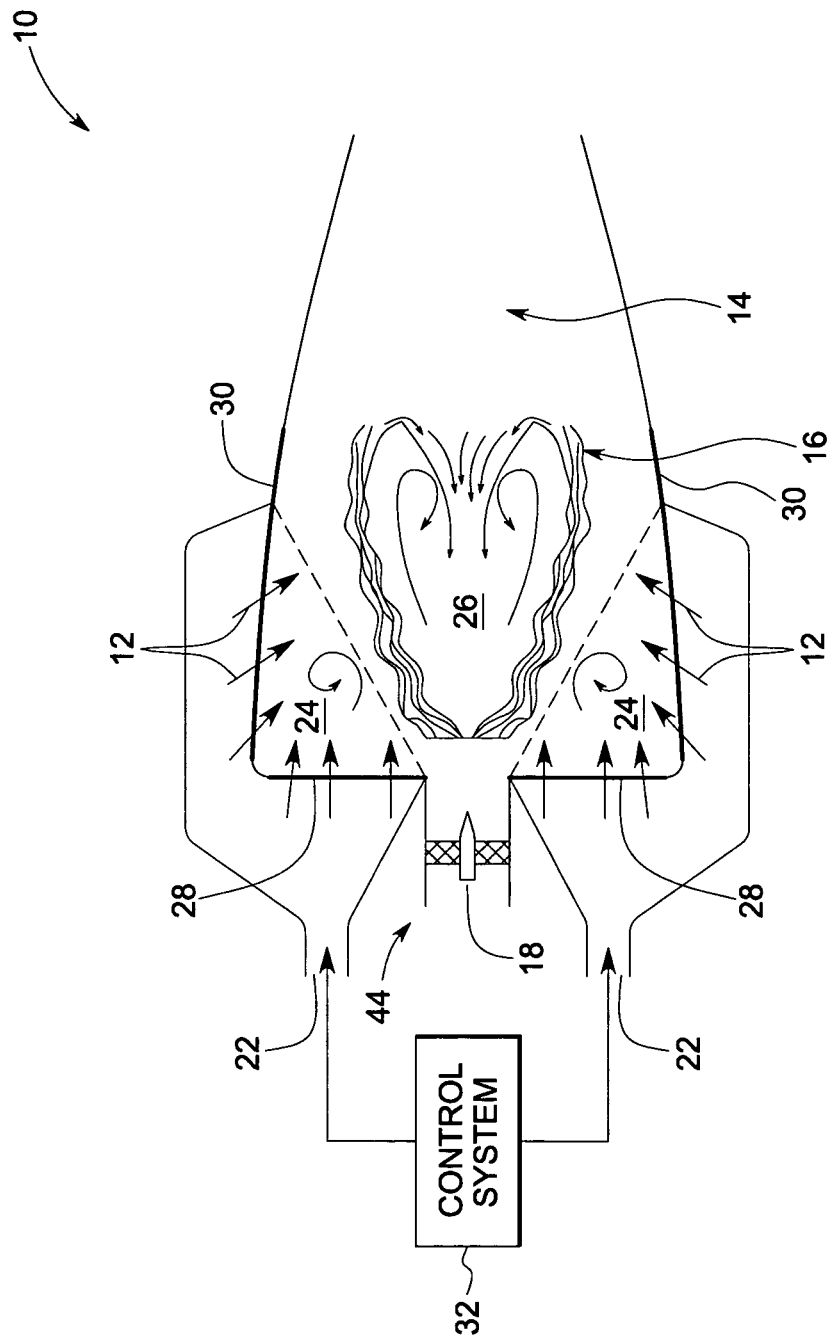
FIG. 1 is a diagrammatic illustration of an exemplary configuration of a system with an inflow of forced air for controlling combustion dynamics in a combustion chamber.

In an illustrated embodiment as shown in FIG. 1, a combustor system 10 with an inflow of forced air 12 for controlling combustion dynamics in a combustion chamber 14 is depicted. In a particular embodiment as shown, the combustion chamber 14 may be an annular combustion chamber. In another embodiment, the combustion chamber 14 may be a can combustion chamber or a multi-nozzle can-annular combustion chamber. Premixed fuel-air mixture 16 is introduced via a fuel injector 44 including a fuel inlet 18 into the combustion chamber 14. A flow of forced air 12 is passed through an effusion air inlet 22 or an inlet manifold 22 into corner recirculation zones 24 at two corners of the combustion chamber 14. The combustion chamber 14 includes a dome plate 28, which extends from the front face of the combustion chamber above the inlet 18 to the front face below the inlet 18. The combustion chamber 14 also includes two combustion liners 30, one of them disposed on an upper side of the combustion chamber 14 and the other being disposed on a lower side of the combustion chamber 14. One of the "corners" refers to an area above the inlet 18 where a dome plate 28 and a combustion liner 30 meet. The other "corner" refers to an area below the inlet 18 where the dome plate 28 and the combustion liner 30 meet. A center torroidal recirculation zone 26 can be formed at the center of the combustion chamber 14. In a case where there is no forced airflow through the dome plate and combustor liners, other than combustor cooling air, at least one of the corner recirculation zones 24 and the center toroidal recirculation zone 26 would usually form and take a shape that fits naturally in a given geometry. However, in this embodiment, the recirculation zone is modified in shape and size using various techniques to enhance flame stability.

The forced air 12 modifies the shape of the corner recirculation zones 24 and the central toroidal recirculation zone 26. In addition, the forced air 12 may also reduce the size of the recirculation zones. Reshaping of the corner recirculation zones 24 and the center toroidal recirculation zone 26 enables decreasing combustion pressure fluctuations in the combustion chamber 14. The flow of forced air 12 may be supplied from a main air supply and is forced through holes in the dome plate 28 and through holes in an upstream section of the combustor liner 30. Based on their location, these holes are appropriately sized to reshape or eliminate the corner recirculation zone. The dome plate 28 and the combustor liner 30 may form a covering so as to direct the flow of forced air 12 into the recirculation zones 24. In a particular embodiment, the flow of forced air 12 may be a steady flow. The inflow of forced air 12 is controlled by a control system 32 that continuously monitors the combustion chamber 14 for any combustion dynamics. In a particular embodiment, the control system 32 may monitor changes in pressure, temperature and/or heat release in the combustion chamber 14. In another embodiment, multiple sensors installed in the combustor system 10 sense any fluctuations in pressure, temperature and/or heat release in the combustion chamber 14 and output a signal corresponding to the fluctuations to the control system 32.

Figure 2:
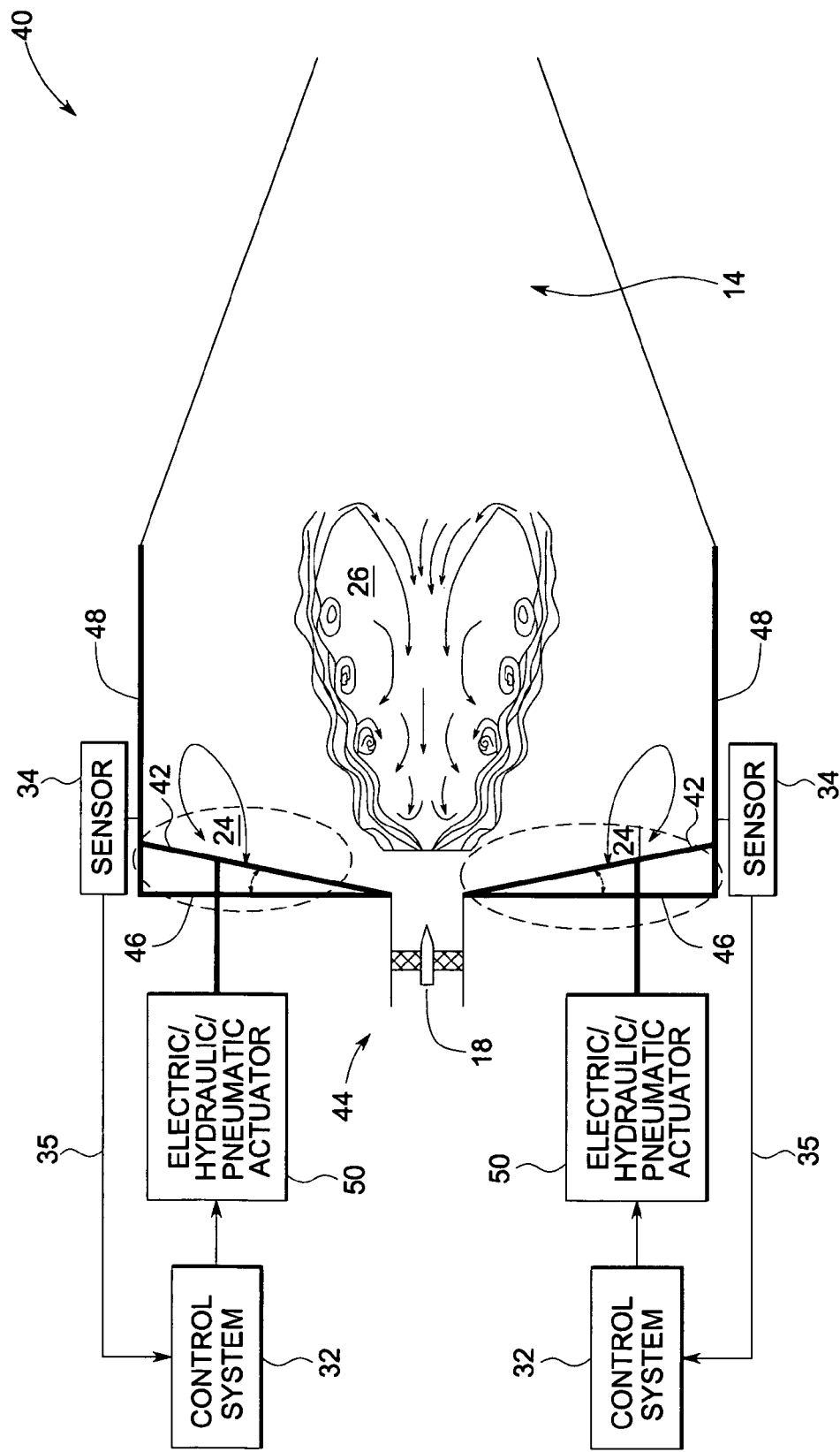
FIG. 2 is a diagrammatic illustration of an exemplary configuration of a system with a movable dome plate for controlling combustion dynamics.

In another illustrated embodiment as shown in FIG. 2, an exemplary configuration of a combustor system 40 with a mechanically actuated movable dome plate 42 for controlling combustion dynamics is depicted. The system 40 may include one or more movable dome plate segments 42 in and out of the plane shown and placed in front of a fixed dome plate 46. In a particular embodiment, the movable plates 42 may be flat as shown in FIG. 2 and oriented about the nozzle exit with a vertex near the nozzle. In another embodiment the vertex is near the junction of the combustion linear and fixed dome plate. In another embodiment, the movable dome plates 42 may be curved in shape. In the embodiment of FIG. 2, the system 40 includes two flat, movable dome plates 42 upstream of the interior of the combustion chamber 14. In a particular embodiment as shown, the combustion chamber 14 may be an annular combustion chamber. In another embodiment, the combustion chamber 14 may be a can combustion chamber or a can-annular combustion chamber. One of the movable dome plates 42 is disposed above the inlet 18 as referenced in FIG. 1 and the other movable dome plate 42 is disposed below the inlet 18. A fuel injector 44 injects premixed fuel-air mixture 16, as referenced in FIG. 1 into a combustor 14, as referenced in FIG. 1. In this embodiment, the system 40 also includes two fixed dome plates 46 and two fixed combustor liners 48. The fixed dome plates 46 are disposed above the inlet 18 as referenced in FIG. 1 and below the inlet 18. The fixed combustor lines 48 are disposed on an upper side of the combustion chamber 14 and on a lower side of the combustion chamber 14 as shown. The movable dome plates 42 may be rotated around a mechanical attachment that facilitates movement into the combustion chamber 14 by an actuator 50. In an embodiment, the mechanical attachment may be a hinge. In a particular embodiment, the actuator 50 may include an electric, a hydraulic or a pneumatic actuator.

In another embodiment, the actuator 50 may be circular and around the fuel injector 44. The actuator 50 may be configured to move the dome plates 42 so as to optimize the aerodynamic shape. The term "optimize" used herein refers to facilitating an aerodynamic flow inside the combustion chamber 14 so as to reduce combustion instabilities and hence reduce fluctuations in factors such as pressure and temperature that effect gas turbine operability. Reducing combustion dynamics could be accomplished by reducing the instability pressure amplitudes and/or shifting the instability from a dominant tone or frequency of oscillation to a different frequency. A control system 32 as referenced in FIG. 1, continuously monitors the combustion chamber 14 for any fluctuations in combustion dynamics. Some non-limiting examples of monitoring fluctuations in combustion dynamics may include monitoring changes in pressure and temperature. The combustion chamber 14 may include multiple sensors 34 that sense change in non-limiting parameters such as temperature, pressure, heat release and optical output of the flame. In a particular embodiment, the optical output may include intensity in visible, ultraviolet or infrared wavelength ranges. The sensors 34 output a signal 35 corresponding to a change in any of the aforementioned parameters to the control system 32. Accordingly, the control system 32 controls the actuator 50 that enables movement of the movable dome plate 42. The shape, oscillation modes and size of the corner recirculation zones 24 as referenced in FIG. 1 and the center toroidal recirculation zone 26 as referenced in FIG. 1, are modified as the movable dome plates 42 are rotated about their attachment points by an optimal degree thus suppressing or eliminating dominant instabilities in the combustion chamber 14. Some non-limiting examples of dominant instabilities may include fluctuations in pressure, fluctuations in temperature and fluctuations in heat release. The term "dominant instabilities" used herein refers to instabilities in factors such as temperature, pressure, or heat release that largely affect combustion dynamics in the combustion chamber 14. In another embodiment, suppressing or eliminating dominant instabilities may include reducing amplitudes of pressure oscillations and shifting frequency of pressure oscillations to a non-resonant tone. During operating conditions when low dynamics exist in the combustor system 40, the movable dome plates 42 lie aligned with the fixed dome plates 46 without interfering with flow in the combustion chamber 14. However, when the control system 32 senses significant fluctuations, the movable dome plates 42 are rotated to a degree sufficient to mitigate the instabilities.

Figure 3:
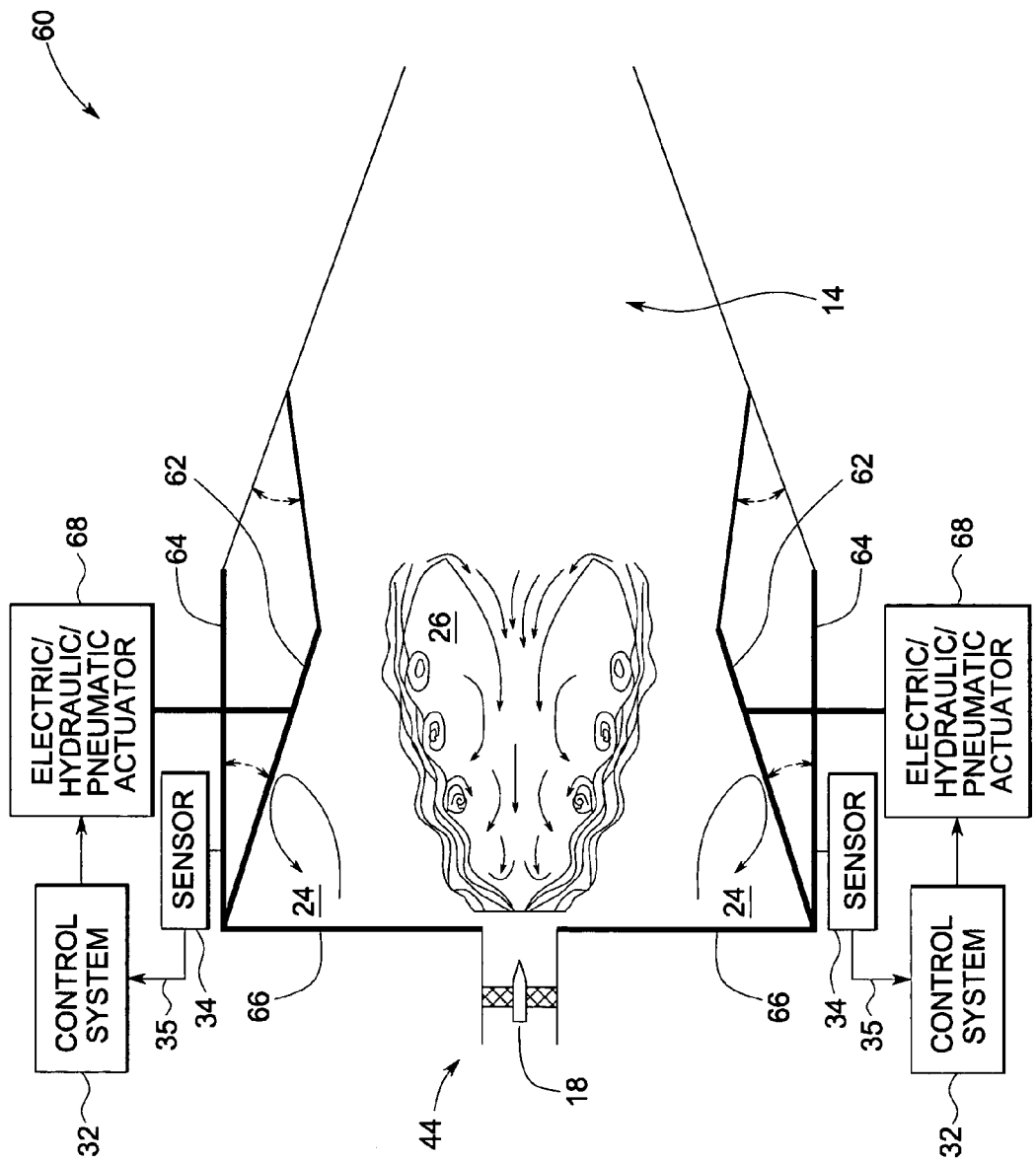
FIG. 3 is a diagrammatic illustration of an exemplary configuration of a system with a movable combustion liner for controlling combustion dynamics.

FIG. 3 is a diagrammatic illustration of an exemplary configuration of a combustor system 60 with mechanically actuated inner combustor liners 62 for controlling combustion dynamics. The system 60 may include one or more movable inner liners in an upstream section of the combustor's fixed combustor liner 64. In this embodiment, the system 60 includes two movable inner combustor liners 62. One of the two movable inner combustor liners 62 is disposed on an upper side of the combustion chamber 14 as referenced in FIG. 1 and the other is disposed on a lower side of the combustion chamber 14 creating two fixed points about which the combustion liner is actuated. In another embodiment the upstream end of the inner combustor liner 62 is movable, and in yet another embodiment both the upstream and the downstream end of the inner combustor liner 62 is movable. In a particular embodiment shown in FIG. 3, the combustion chamber 14 may be an annular combustion chamber. In another embodiment, the combustion chamber 14 may be a can combustion chamber or a can-annular combustion chamber. The system 60 also includes fixed combustor liners 64 and fixed dome plates 66 in an upstream section. A fuel injector 44 as referenced in FIG. 2, injects a partially premixed or a lean premixed fuel-air mixture 16, as referenced in FIG. 1 into a combustion chamber 14, as referenced in FIG. 1. The movable inner combustor liners 62 may be rotated around their axes towards or away from the fixed combustor liners 64 by an actuator 68. In a particular embodiment, the actuator 68 may include an electric, a hydraulic or a pneumatic actuator. In another embodiment, the actuator 50 may be circular and positioned around the fuel injector 44. The actuator 68 may be configured to move the movable liners 62 so as to optimize the aerodynamic shape. The term "optimize" used herein refers to facilitating an aerodynamic flow inside the combustion chamber 14 so as to reduce fluctuations in factors such as pressure, temperature and/or heat release that effect combustion dynamics.

A control system 32 as referenced in FIG. 1 continuously monitors the combustion chamber 14 for any fluctuations in combustion dynamics. The combustion chamber 14 may include multiple sensors 34 as referenced in FIG. 2 that sense change in non-limiting parameters such as temperature, pressure, heat release and optical output of the flame. The sensors 34 output a signal 35 as referenced in FIG. 2 corresponding to a change in any of the aforementioned parameters to the control system 32. Accordingly, the control system 32 controls the actuator 68 that enables movement of the movable inner combustor liners 62. The shape, oscillation mode and size of the corner recirculation zones 24 as referenced in FIG. 1 and the center toroidal recirculation zone 26 as referenced in FIG. 1 is modified as the movable inner combustor liners 62 are rotated by an optimal degree thus suppressing or eliminating dominant instabilities. Some non-limiting examples of dominant instabilities may include pressure fluctuations, temperature fluctuations, and heat release fluctuations. During operating conditions when no dynamics exist in the combustor system 60, the movable combustor liners 62 lie aligned with the fixed combustor liners 64 without interfering with flow in the combustion chamber 14. However, when the control system 32 senses fluctuations, the movable combustor liners 62 are rotated to a degree sufficient to mitigate instabilities.

Figure 4:
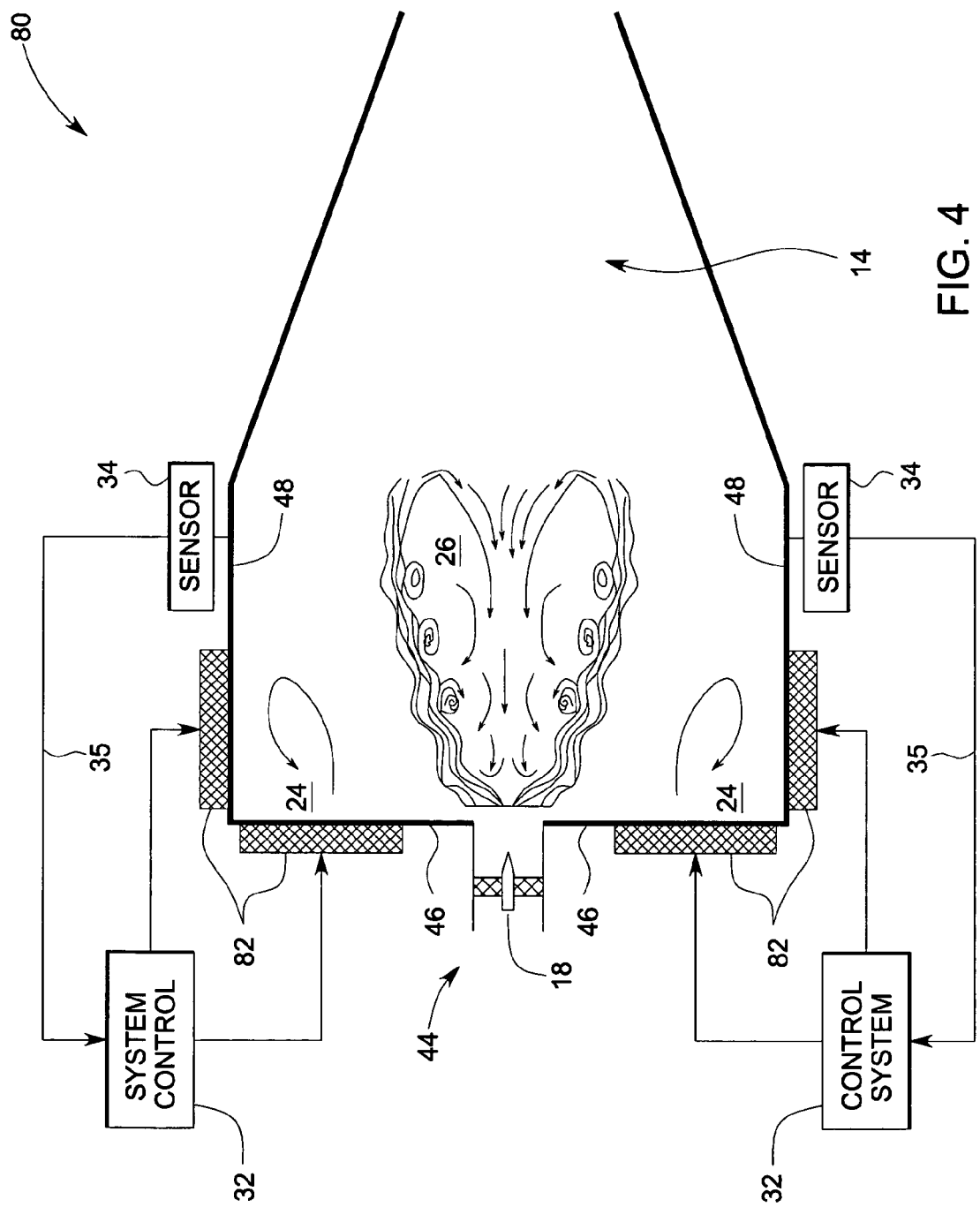
FIG. 4 is a diagrammatic illustration of an exemplary configuration of a system with micro-electro-mechanical systems based actuators for controlling combustion dynamics.

In another illustrated embodiment of the invention as shown in FIG. 4, a combustor system 80 with built in or attached actuators 82 for controlling combustion dynamics is depicted. The system 80 includes a fuel injector 44 as referenced to in FIG. 2, which injects a partially premixed or a lean premixed fuel-air mixture 16, as referenced in FIG. 1 into a combustion chamber 14. In a particular embodiment as shown, the combustion chamber 14 may be an annular combustion chamber. In another embodiment, the combustion chamber 14 may be a can combustion chamber or a can-annular combustion chamber. The system 80 also includes fixed dome plates 46, as referenced to in FIG. 2 and fixed upper and lower combustor liners 48 as referenced in FIG. 2. The actuators 82 may be attached or built onto the dome plates 46 or the combustor liners 48. In a particular embodiment, the actuators 82 may be attached or built onto both, the dome plates 46 and the combustor liners 48. The actuators 82 modulate the corner recirculation zones 24 and the center recirculation zone 26 by supplying a specific distribution of controlled airflow into the combustion chamber 14 as referenced in FIG. 1 to eliminate dominant instabilities present. The system 80 also includes a control system 32 as referenced in FIG. 1, which continuously monitors the combustion chamber 14 for any combustion dynamics. The combustion chamber 14 may include multiple sensors 34 as referenced in FIG. 2 that sense changes in non-limiting parameters such as temperature, pressure, heat release and optical output of the flame. The sensors 34 output a signal 35 as referenced in FIG. 2 corresponding to a change in any of the aforementioned parameters to the control system 32. Accordingly, the control system 32 activates the actuators 82 that distribute a controlled airflow as, when, and where needed.

In a particular embodiment, the actuators 82 may include one or more pulsed detonation actuators that supply a pulsed flow of air whenever required into the combustion chamber 14. These pulsed detonation actuators force a mass of air into the combustor at frequencies dictated by the control system 32. The forced airflow may be derived from the combustor flow, resulting in a zero net flow of air or from an inlet flow. The actuators may operate on fuel and air supplied via the fuel injector 44 or via an independent supply channel. In another embodiment, the actuators 82 may include one or more micro-electro-mechanical system based actuators that supply a controlled airflow into the combustion chamber 14 when there are dominant instabilities. MEMS based actuators used in this application may be powered electrically or by another power source dependent or independent of the combustion system 80. They may drive the forced air entering into the combustor chamber 14 at frequencies dictated by the control system 32. The diameter and frequency of these jets can vary along the surface and is designed to significantly impact the recirculation zone. In yet another embodiment, the actuator 82 may include one or more synthetic jet actuators that produce a jet stream of air as and when needed to stabilize the combustion dynamics. Synthetic jets used herein may be actuated with an external power supply or via power tapped directly or indirectly from the combustor. The air mass moved by these synthetic jet actuators may be obtained directly form the combustor air flow, therefore the actuators have a zero net flow of air. This actuated air may be pulsed at frequencies dictated by the control system 32. The diameter and frequency of these jets can very along the surface and are designed to significantly impact the recirculation zone.

FIG. 5 is a flow chart representing steps involved in an exemplary method 90 of operation of a combustor system to control combustion dynamics. The method 90 includes providing a flow of partially premixed or premixed fuel air mixture into a combustion chamber in step 92. The method 90 also includes monitoring combustion for combustion dynamics via a control system in step 94. The monitoring in step 94 may include sensing changes in downstream pressure via multiple sensors in the combustion chamber. In a particular embodiment, the monitoring may include sensing changes in temperature via multiple sensors in the combustion chamber. In another embodiment, the monitoring may include sensing unsteady flow oscillations via multiple sensors in the combustion chamber. In yet another embodiment, the monitoring may include monitoring unsteady heat release in the combustor. In another embodiment, the monitoring may include sensing optical variations in the combustion chamber from the flame. Some non-limiting examples of optical variations may include variations in optical intensity or spectral content. The method 90 further includes comparing level of combustion dynamics with an acceptable limit in step 96. In a case of the level of combustion dynamics being below the acceptable limit, the monitoring is continued. In a case of the level of combustion dynamics being above the acceptable limit in step 98, the method 90 includes actuating the combustor system to control combustion dynamics in step 100. The actuating in step 100 may include adjusting geometry of one or more dome plates and one or more combustor liners to modify the shape of recirculation zones and consequently reduce dominant instabilities in combustion. In another embodiment, the actuating in step 100 may include blowing air through a specific passage at one or more corners of a combustion chamber via a manifold to modify the shape of the recirculation zones. In yet another embodiment, the actuating may include supplying a pulsed flow of air via a pulsed detonation actuator, a micro-electro-mechanical system based actuator or a synthetic jet actuator.

The various embodiments of a system for controlling combustion dynamics and a method for operating the same described above thus provide a way to achieve a sustained lean, premixed or partially premixed flame in the combustor without combustion dynamics. These techniques and systems also allow for highly efficient gas turbine engines or pulsed jet engines due to improved combustion in their respective combustors.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of movable dome plates described with respect to one embodiment can be adapted for use with MEMS based actuators described with respect to another. Similarly, the various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of controlling combustion dynamics comprising:
   providing a flow of premixed fuel and air into a combustor, the combustor comprising:
      a combustion chamber;
      an inlet for feeding a fuel-air mixture into the combustion chamber;
      a fixed dome plate at an upstream end of the combustion chamber; and
      a liner connected to the fixed dome plate and extending along a length of the combustion chamber;
      at least one movable dome plate disposed within the combustion chamber and axially movable with respect to the fixed dome plate to control one or more recirculating zones;
   monitoring combustion for combustion dynamics;
   comparing level of combustion dynamics with an acceptable limit; and
   actuating the movable dome plate to control combustion dynamics based upon the comparison.

2. The method of claim 1, wherein the monitoring comprises sensing static pressure and dynamic pressure via a plurality of sensors in the combustion chamber.

3. The method of claim 1, wherein the monitoring comprises sensing temperature via a plurality of sensors in the combustion chamber.

4. The method of claim 1, wherein the monitoring comprises sensing heat release via a plurality of sensors in the combustion chamber.

5. The method of claim 1, wherein the monitoring comprises sensing changes in optical output of the flame via a plurality of sensors in the combustion chamber.

6. A method of controlling combustion dynamics comprising:
   providing a flow of premixed fuel and air into a combustor, the combustor comprising:
      a combustion chamber;
      an inlet for feeding a fuel-air mixture into the combustion chamber;
      a fixed dome plate at an upstream end of the combustion chamber; and
      a liner connected to the fixed dome plate and extending along a length of the combustion chamber;
      at least one movable liner disposed within the combustion chamber and radially movable with respect to the liner to control one or more recirculating zones,
   monitoring combustion for combustion dynamics;
   comparing level of combustion dynamics with an acceptable limit; and
   actuating the movable liner to control combustion dynamics based upon the comparison.

7. A system for controlling combustion dynamics comprising:
   a combustor having a combustion chamber and an inlet for feeding a fuel-air mixture into the combustion chamber;
   a fixed dome plate at an upstream end of the combustion chamber;
   a liner connected to the fixed dome plate and extending along a length of the combustion chamber;
   at least one sensor for sensing conditions in the combustion chamber; and
   at least one movable dome plate disposed within the combustion chamber and axially movable with respect to the fixed dome plate to control one or more recirculating zones in response to the at least one sensor.

8. The system of claim 7, wherein the at least one movable dome plate comprises a plurality of movable dome plates to shape one or more recirculation zones in the combustion chamber.

9. The system of claim 7, further comprising an actuator connected to the movable dome plate, wherein the actuator is configured to move the movable dome plate so as to optimize the shape, size and frequency modes of one or more recirculation zones in the combustion chamber.

10. The system of claim 9, wherein the actuator comprises one or more electric, hydraulic or pneumatic actuators.

11. The system of claim 7, further comprising a control system connected to the at least one sensor and the at least one movable dome plate to monitor and control combustion dynamics in the combustion chamber.

12. The system of claim 11, the at least one sensor comprises a plurality of sensors configured to sense changes in at least one of temperature, static pressure upstream of the combustion chamber, static pressure downstream of the combustion chamber, dynamic pressure upstream of the combustion chamber, dynamic pressure downstream of the combustion chamber, heat release and optical output of the flame and output signals to the control system.

13. A gas turbine engine system comprising a combustor wherein the combustor comprises:
   a combustion chamber;
   an inlet for feeding a fuel-air mixture into the combustion chamber;

a dome plate at an upstream end of the combustion chamber;

a liner connected to the fixed dome plate and extending along a length of the combustion chamber;

at least one sensor for sensing conditions in the combustion chamber; and at least one movable liner disposed within the combustion chamber and radially movable with respect to the combustor liner to control one or more recirculating zones in response to the at least one sensor.

14. The system of claim 13, wherein the at least one movable liner comprises a plurality of movable liners to shape one or more recirculation zones in the combustion chamber.

15. The system of claim 13, further comprising an actuator connected to the movable liner, wherein the actuator is configured to move the dome plate so as to optimize the shape, size and frequency modes of one or more recirculation zones in the combustion chamber.

16. The system of claim 15, wherein the actuator comprises one or more electric, hydraulic or pneumatic actuators.

17. The system of claim 13, further comprising a control system connected to the at least one sensor and the at least one dome plate to monitor and control combustion dynamics in the combustion chamber.

18. The system of claim 13, wherein the at least one sensor comprises a plurality of sensors configured to sense changes in at least one of temperature, static pressure upstream of the combustion chamber, static pressure downstream of the combustion chamber, dynamic pressure upstream of the combustion chamber, dynamic pressure downstream of the combustion chamber, heat release and optical output of the flame and output signals to the control system.

\* \* \* \* \*